(12) United States Patent
Petrov et al.

(10) Patent No.: US 9,507,852 B2
(45) Date of Patent: Nov. 29, 2016

(54) TECHNIQUES FOR DISCRIMINATIVE DEPENDENCY PARSING

(71) Applicant: Google Inc., Mountain View, CA (US)

(72) Inventors: Slav Petrov, New York, NY (US); Alexander Rush, New York, NY (US)

(73) Assignee: Google Inc., Mountain View, CA (US)

( * ) Notice: Subject to any disclaimer, the term of this patent is extended or adjusted under 35 U.S.C. 154(b) by 407 days.

(21) Appl. No.: 14/102,087

(22) Filed: Dec. 10, 2013

(65) Prior Publication Data

US 2015/0161996 A1 Jun. 11, 2015

(51) Int. Cl.
| | |
|---|---|
| G10L 15/18 | (2013.01) |
| G06F 17/30 | (2006.01) |
| G06F 17/27 | (2006.01) |
| G10L 15/26 | (2006.01) |

(52) U.S. Cl.
CPC ..... *G06F 17/30654* (2013.01); *G06F 17/2775* (2013.01); *G10L 15/1822* (2013.01); *G10L 15/26* (2013.01)

(58) Field of Classification Search
None
See application file for complete search history.

(56) References Cited

U.S. PATENT DOCUMENTS

| | | | | |
|---|---|---|---|---|
| 6,832,191 B1 * | 12/2004 | Frasca | ............. | G10L 15/063 704/240 |
| 6,882,972 B2 * | 4/2005 | Kompe | ............. | G10L 15/065 704/251 |
| 7,143,036 B2 * | 11/2006 | Weise | ............. | G06F 17/2715 704/245 |
| 7,533,023 B2 * | 5/2009 | Veprek | ............. | G10L 13/047 704/200 |
| 7,657,431 B2 * | 2/2010 | Hayakawa | ............. | G10L 17/14 704/235 |
| 8,348,029 B2 * | 1/2013 | Winocur | ............. | B60G 15/068 188/322.12 |
| 8,374,866 B2 * | 2/2013 | Weinstein | ............. | G10L 15/005 704/243 |
| 8,554,559 B1 * | 10/2013 | Aleksic | ............. | G10L 15/30 704/235 |
| 8,571,859 B1 * | 10/2013 | Aleksic | ............. | G10L 15/07 704/231 |
| 8,583,432 B1 * | 11/2013 | Biadsy | ............. | G10L 15/063 704/10 |
| 8,639,508 B2 * | 1/2014 | Zhao | ............. | G10L 15/08 379/88.01 |
| 8,775,174 B2 * | 7/2014 | Conejero | ............. | G06F 17/3002 704/235 |
| 8,788,266 B2 * | 7/2014 | Kitade | ............. | G10L 15/197 704/10 |
| 8,812,312 B2 * | 8/2014 | Fukuda | ............. | G10L 15/02 704/231 |
| 8,938,391 B2 * | 1/2015 | Zweig | ............. | G10L 15/197 704/251 |

(Continued)

*Primary Examiner* — Richemond Dorvil
*Assistant Examiner* — Thuykhanh Le
(74) *Attorney, Agent, or Firm* — Remarck Law Group PLC

(57) ABSTRACT

A computer-implemented method can include receiving a speech input representing a question, converting the speech input to a string of characters, and obtaining tokens each representing a potential word. The method can include determining one or more part-of-speech (POS) tags for each token and determining sequences of the POS tags for the tokens, each sequence of the POS tags including one POS tag per token. The method can include determining one or more parses for each sequence of the POS tags for the tokens and determining a most-likely parse and its corresponding sequence of the POS tags for the tokens to obtain a selected parse and a selected sequence of the POS tags for the tokens. The method can also include determining a most-likely answer to the question using the selected parse and the selected sequence of the POS tags for the tokens and outputting the most-likely answer.

17 Claims, 4 Drawing Sheets

(56) References Cited

U.S. PATENT DOCUMENTS

| | | | | |
|---|---|---|---|---|
| 2002/0035537 A1* | 3/2002 | Waller | ............... | G06Q 10/087 705/37 |
| 2003/0012347 A1* | 1/2003 | Steinbiss | ............... | G10L 15/065 379/88.01 |
| 2003/0191625 A1* | 10/2003 | Gorin | ............... | G06F 17/278 704/1 |
| 2004/0030556 A1* | 2/2004 | Bennett | ............... | G06F 17/27 704/270 |
| 2004/0138893 A1* | 7/2004 | Mochary | ............... | G10L 15/04 704/277 |
| 2004/0215458 A1* | 10/2004 | Kobayashi | ............... | G10L 15/06 704/251 |
| 2004/0243409 A1* | 12/2004 | Nakagawa | ............... | G06F 17/2755 704/240 |
| 2005/0038643 A1* | 2/2005 | Koehn | ............... | G06F 17/2818 704/2 |
| 2005/0071149 A1* | 3/2005 | Xun | ............... | G06F 17/271 704/4 |
| 2005/0143999 A1* | 6/2005 | Ichimura | ............... | G10L 15/26 704/251 |
| 2006/0149558 A1* | 7/2006 | Kahn | ............... | G10L 15/063 704/278 |
| 2006/0195321 A1* | 8/2006 | Deligne | ............... | G10L 15/18 704/257 |
| 2007/0100624 A1* | 5/2007 | Weng | ............... | G06F 17/2715 704/257 |
| 2009/0099841 A1* | 4/2009 | Chen | ............... | G06K 9/72 704/9 |
| 2009/0119103 A1* | 5/2009 | Gerl | ............... | G10L 17/04 704/243 |
| 2011/0282661 A1* | 11/2011 | Dobry | ............... | G10L 17/02 704/231 |
| 2012/0290302 A1* | 11/2012 | Yang | ............... | G10L 15/08 704/236 |
| 2013/0204606 A1* | 8/2013 | Zong | ............... | G06F 17/277 704/8 |
| 2014/0278418 A1* | 9/2014 | Chen | ............... | G10L 17/00 704/246 |

* cited by examiner

TECHNIQUES FOR DISCRIMINATIVE DEPENDENCY PARSING

FIELD

The present disclosure relates to syntactic analysis and, more particularly, to techniques for discriminative dependency parsing.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Dependency parsing is typically modeled as a pipeline of independent tasks: (1) tokenization, (2) part-of-speech (POS) tagging, and (3) parsing. Tokenization involves partitioning an input string of characters into a set of tokens, e.g., words. POS tagging involves assigning a POS tag to each token. Parsing involves determining a syntactic head of each token and building a parse tree that represents relationships between tokens. Tokenization can be difficult for languages that do not use white space to separate words (Chinese, Japanese, Korean, etc.) and for languages that have a rich morphology (Arabic, Hebrew, Turkish, etc.). Moreover, if a fixed part-of-speech (POS) tagging is selected and then treated as a ground truth by the parser, there can be POS tagging errors that the parser cannot correct. Rather, the fixed POS tagging may have errors, and these errors can propagate through the pipeline and cause errors at the parser.

SUMMARY

A computer-implemented method is presented. The method can include receiving, at a computing device having one or more processors, a speech input representing a question. The method can include converting, at the computing device, the speech input to a string of characters in a natural language. The method can include obtaining, at the computing device, tokens corresponding to the string of characters in the natural language, each token representing a potential word including at least one character of the string of characters. The method can include determining, at the computing device, one or more part-of-speech (POS) tags for each token. The method can include determining, at the computing device, sequences of the POS tags for the tokens, each sequence of the POS tags including one POS tag per token. The method can include determining, at the computing device, one or more parses for each sequence of the POS tags for the tokens. The method can include determining, at the computing device, a most-likely parse and its corresponding sequence of the POS tags for the tokens to obtain a selected parse and a selected sequence of the POS tags for the tokens. The method can include determining, at the computing device, a most-likely answer to the question using the selected parse and the selected sequence of the POS tags for the tokens. The method can also include outputting, by the computing device, the most-likely answer to the question.

In some embodiments, determining the most-likely parse and its corresponding sequence of the POS tags for the tokens includes solving, at the computing device, a maximum-a-posteriori (MAP) inference problem defined as:

$$(x^*, y^*) = \underset{x \in X, y \in Y}{\operatorname{argmax}} \theta_T^T F^{(w)} x + \theta_P^T G^{(x,w)} y,$$

where $x^*$ and $y^*$ represent a specific sequence of the POS tags and a specific parse, respectively, X represents a set of the POS tags x, Y represents a set of the parses y, $\theta_T^T$ represents a transformed tagging weight vector, $F^{(w)}$ represents a tagging feature matrix, $\theta_P^T$ represents a transformed parsing weight vector, and $G^{(x,w)}$ represents a parsing feature matrix.

In other embodiments, solving the MAP inference problem includes solving, at the computing device, an integer linear program (ILP) defined as:

$$\max_{x \in X, y \in Y, z \in \{0,1\}^{|J|}} \theta_T^T F^{(w)} x + \theta_P^T H z,$$

$$\sum_{j \in J: j_{arc}=a} z(j) = x(a) \; \forall \, a \in A,$$

$$\sum_{j \in J: j_{mt}=b} z(j) = y(b) \; \forall \, b \in B, \text{ and}$$

$$\sum_{j \in J: j_{ht}=b, j_{mod}=m} z(j) = y(b) \; \forall \, b \in B, m \in [n],$$

where J represents a set of joint features j, each joint feature j corresponding to a head position h, a modifier position m, a trigram context t centered at the head, and a trigram context u centered at the modifier, H represents a parsing feature matrix based on the feature matrix $G^{(x,w)}$ but having a dependency on x removed, z represents a variable replacing cubic terms $y(j_{arc})x(j_{ht})x(j_{mt})$ with $j_{arc}=(h,m)$, $j_{ht}=(h,t)$, $j_{mt}=(m,u)$, and $j_{mod}=m$, a represents a specific arc of a set of first-order dependency arcs A, b represents a specific trigram of a set of trigrams B, and [n] represents a set of the tokens.

In some embodiments, solving the ILP includes utilizing, at the computing device, an exact dynamic programming algorithm.

In other embodiments, solving the ILP includes utilizing, at the computing device, relaxed parsing with independent contextual tagging.

In some embodiments, solving the ILP further includes performing, at the computing device, coarse-to-fine pruning to increase a speed of determining the most-likely parse and its corresponding sequence of the POS tags for the tokens.

In other embodiments, solving the ILP utilizing relaxed parsing with independent contextual tagging includes solving, at the computing device, the ILP as a Lagrangian dual decomposition defined as follows:

$$\min_{\lambda, \beta} \max_{x \in X} (\theta_T^T F + \beta^T) x + \max_{z \in Z} (\theta_P^T H + \lambda^T) z - \max_{(x', z') \in C} \beta^T x' + \lambda^T z',$$

where Z represents a set of all z, $\lambda^T$ and $\beta^T$ represent transforms of matrices $\lambda \in R^{|B|}$ and $\beta = R^{|J|}$, R represents parameters of the tagger $\theta_T \in R^t$ and the parser $\theta_P \in R^p$, x=x', and z=z', and where C represents a set defined as:

$$C = \left\{ x \in \{0, 1\}^{|B|}, \; z \in \{0, 1\}^{|J|} : \forall \, b \in B, m \in [n] \right.$$

-continued $$\sum_{t \in T} x(m, t) = 1, \quad \sum_{j \in J: j_{mt}=b} z(j) = x(b)$$

$$\sum_{j \in J: j_{mod}=m} z(j) = 1, \quad \sum_{j \in J: j_{ht}=b, j_{mod}=m} z(j) \le x(b) \bigg\}.$$

In some embodiments, the method further comprises receiving, at the computing device, the string of characters in the natural language, and tokenizing, at the computing device, the string of characters to obtain the tokens.

A computing device is also presented. The computing device can include a communication device and one or more processors. The communication device can be configured to receive a speech input representing a question. The communication device can also be configured to output a most-likely answer to the question. The one or more processors can be configured to convert the speech input to a string of characters in a natural language. The one or more processors can be configured to obtain tokens corresponding to the string of characters in the natural language, each token representing a potential word including at least one character of the string of characters. The one or more processors can be configured to determine one or more part-of-speech (POS) tags for each token. The one or more processors can be configured to determine sequences of the POS tags for the tokens, each sequence of the POS tags including one POS tag per token. The one or more processors can be configured to determine one or more parses for each sequence of the POS tags for the tokens. The one or more processors can be configured to determine a most-likely parse and its corresponding sequence of the POS tags for the tokens to obtain a selected parse and a selected sequence of the POS tags for the tokens. The one or more processors can also be configured to determine the most-likely answer to the question using the selected parse and the selected sequence of the POS tags for the tokens.

In some embodiments, the one or more processors are configured to determine the most-likely parse and its corresponding sequence of the POS tags for the tokens by solving a maximum-a-posteriori (MAP) inference problem defined as:

$$(x^*, y^*) = \underset{x \in X, y \in Y}{\operatorname{argmax}} \theta_T^T F^{(w)} x + \theta_P^T G^{(x,w)} y,$$

where x* and y* represent a specific sequence of the POS tags and a specific parse, respectively, X represents a set of the POS tags x, Y represents a set of the parses y, $\theta_T^T$ represents a transformed tagging weight vector, $F^{(w)}$ represents a tagging feature matrix, $\theta_P^T$ represents a transformed parsing weight vector, and $G^{(x,w)}$ represents a parsing feature matrix.

In other embodiments, the one or more processors are configured to solve the MAP inference problem by solving an integer linear program (ILP) defined as:

$$\underset{x \in X, y \in Y, z \in \{0,1\}^{|J|}}{\max} \theta_T^T F^{(w)} x + \theta_P^T H z,$$

$$\sum_{j \in J: j_{arc}=a} z(j) = x(a) \; \forall \, a \in A,$$

-continued $$\sum_{j \in J: j_{mt}=b} z(j) = y(b) \; \forall \, b \in B, \text{ and}$$

$$\sum_{j \in J: j_{ht}=b, j_{mod}=m} z(j) = y(b) \; \forall \, b \in B, m \in [n],$$

where J represents a set of joint features j, each joint feature j corresponding to a head position h, a modifier position m, a trigram context t centered at the head, and a trigram context u centered at the modifier, H represents a parsing feature matrix based on the feature matrix $G^{(x,w)}$ but having a dependency on x removed, z represents a variable replacing cubic terms $y(j_{arc})x(j_{ht})x(j_{mt})$ with $j_{arc}=(h,m)$, $j_{ht}=(h,t)$, $j_{mt}=(m,u)$, and $j_{mod}=m$, a represents a specific arc of a set of first-order dependency arcs A, b represents a specific trigram of a set of trigrams B, and [n] represents a set of the tokens.

In some embodiments, the one or more processors are configured to solve the ILP by utilizing an exact dynamic programming algorithm.

In other embodiments, the one or more processors are configured to solve the ILP by utilizing relaxed parsing with independent contextual tagging.

In some embodiments, the one or more processors are configured to solve the ILP further by performing coarse-to-fine pruning to increase a speed of determining the most-likely parse and its corresponding sequence of the POS tags for the tokens.

In other embodiments, the one or more processors are configured to solve the ILP utilizing relaxed parsing with independent contextual tagging by solving the ILP as a Lagrangian dual decomposition defined as follows:

$$\underset{\lambda, \beta}{\min}\underset{x \in X}{\max}(\theta_T^T F + \beta^T) x + \underset{z \in Z}{\max}(\theta_P^T H + \lambda^T) z - \underset{(x', z') \in C}{\max} \beta^T x' + \lambda^T z',$$

where Z represents a set of all z, $\lambda^T$ and $\beta^T$ represent transforms of matrices $\lambda \in R^{|B|}$ and $\beta = R^{|J|}$, R represents parameters of the tagger $\theta_T \in R^t$ and the parser $\theta_P \in R^p$, x=x', and z=z', and where C represents a set defined as:

$$C = \bigg\{ x \in \{0, 1\}^{|B|}, \quad z \in \{0, 1\}^{|J|} : \forall \, b \in B, m \in [n]$$

$$\sum_{t \in T} x(m, t) = 1, \quad \sum_{j \in J: j_{mt}=b} z(j) = x(b)$$

$$\sum_{j \in J: j_{mod}=m} z(j) = 1, \quad \sum_{j \in J: j_{ht}=b, j_{mod}=m} z(j) \le x(b) \bigg\}.$$

In some embodiments, the communication device is further configured to receive the string of characters in the natural language, and wherein the one or more processors are further configured to tokenize the string of characters to obtain the tokens.

A non-transitory, computer-readable medium is also presented. The computer-readable medium can have instructions stored thereon that, when executed by one or more processors of a computing device, cause the computing device to perform operations including receiving a speech input representing a question. The operations can include converting the speech input to a string of characters in a natural language. The operations can include obtaining tokens corresponding to the string of characters in the natural language, each token representing a potential word including at least one character of the string of characters. The operations can include determining, at the computing device, one or more part-of-speech (POS) tags for each token. The operations can include determining sequences of the POS tags for the tokens, each sequence of the POS tags including one POS tag per token. The operations can include determining one or more parses for each sequence of the POS tags for the tokens. The operations can include determining a most-likely parse and its corresponding sequence of the POS tags for the tokens to obtain a selected parse and a selected sequence of the POS tags for the tokens. The operations can include determining a most-likely answer to the question using the selected parse and the selected sequence of the POS tags for the tokens. The operations can also include outputting the most-likely answer to the question.

In some embodiments, determining the most-likely parse and its corresponding sequence of the POS tags for the tokens includes solving a maximum-a-posteriori (MAP) inference problem defined as:

$$(x^*, y^*) = \underset{x \in X, y \in Y}{\operatorname{argmax}} \theta_T^T F^{(w)} x + \theta_P^T G^{(x,w)} y,$$

where x* and y* represent a specific sequence of the POS tags and a specific parse, respectively, X represents a set of the POS tags x, Y represents a set of the parses y, $\theta_T^T$ represents a transformed tagging weight vector, $F^{(w)}$ represents a tagging feature matrix, $\theta_P^T$ represents a transformed parsing weight vector, and $G^{(x,w)}$ represents a parsing feature matrix.

In other embodiments, solving the MAP inference problem includes solving an integer linear program (ILP) defined as:

$$\underset{x \in X, y \in Y, z \in \{0,1\}^{|J|}}{\max} \theta_T^T F^{(w)} x + \theta_P^T H z,$$

$$\sum_{j \in J: j_{arc}=a} z(j) = x(a) \ \forall \ a \in A,$$

$$\sum_{j \in J: j_{mt}=b} z(j) = y(b) \ \forall \ b \in B, \text{ and}$$

$$\sum_{j \in J: j_{ht}=b, j_{mod}=m} z(j) = y(b) \ \forall \ b \in B, m \in [n],$$

where J represents a set of joint features j, each joint feature j corresponding to a head position h, a modifier position m, a trigram context t centered at the head, and a trigram context u centered at the modifier, H represents a parsing feature matrix based on the feature matrix $G^{(x,w)}$ but having a dependency on x removed, z represents a variable replacing cubic terms $y(j_{arc})x(j_{ht})x(j_{mt})$ with $j_{arc}=(h,m)$, $j_{ht}=(h,t)$, $j_{mt}=(m,u)$, and $j_{mod}=m$, a represents a specific arc of a set of first-order dependency arcs A, b represents a specific trigram of a set of trigrams B, and [n] represents a set of the tokens.

In some embodiments, the operations further include tokenizing the string of characters to obtain the tokens.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
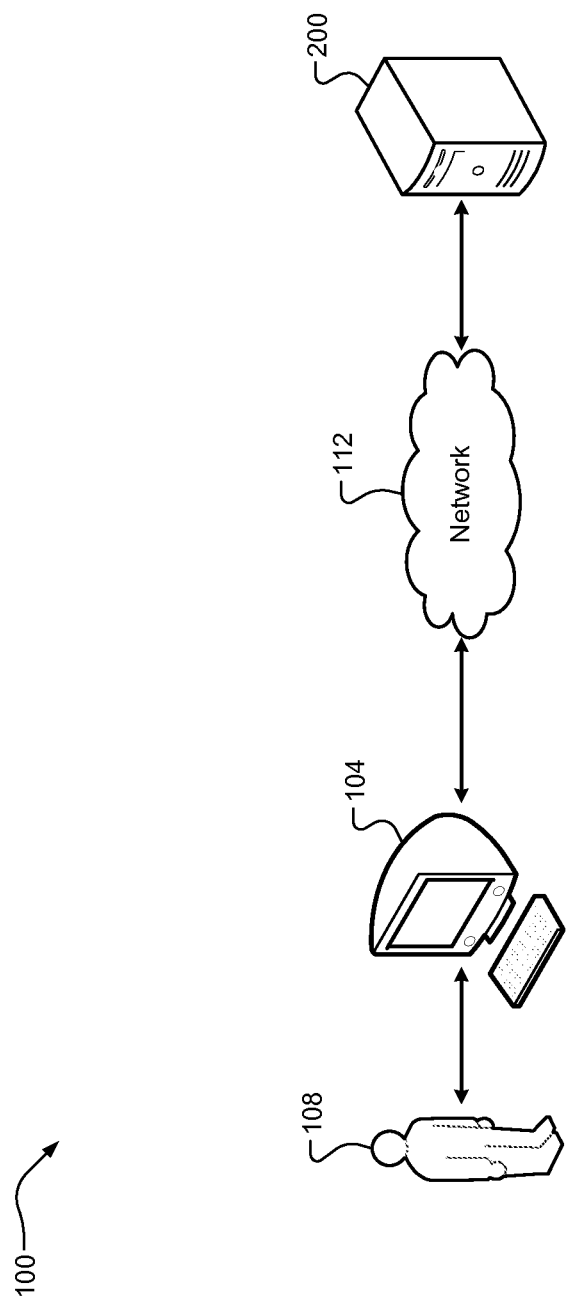
FIG. 1 is a functional block diagram of a computing network including an example computing device according to some implementations of the present disclosure.

Referring now to FIG. 1, a computing network 100 is illustrated. A computing device 104 (a desktop computer, a laptop computer, a tablet computer, a mobile phone, a server, etc.) can receive input from and/or provide output to a user 108. The computing device 104 can communicate with other computing devices via a network 112. The network 112 can include a local area network (LAN), a wide area network (WAN), e.g., the Internet, or a combination thereof. In particular, the computing device 104 can communicate with another computing device 200 via the network 112. In some embodiments, the other computing device 200 may take the form of a server as illustrated. It should be appreciated that the term "server" as used herein can refer to both a single server and two or more servers operating in a parallel or distributed architecture. The computing device 200 can be configured to perform the discriminative dependency parsing techniques described below. It should be appreciated, however, that the computing device 104 can also wholly or partially perform these discriminative dependency parsing techniques.

According to the techniques of the present disclosure, the user 108 can provide a user input at the computing device 104. The user input can be, for example, a speech input or a text input. In the case of a speech input, the computing device 104 can convert the speech input to a text input using a suitable speech-to-text algorithm. For example only, the user input may be a question that the user 108 is requesting an answer to, such as "Where is the nearest gas station?" The computing device 104 can transmit the user input to the other computing device 200 via the network 112. The computing device 104 can then receive a most-likely parse of the text input and its corresponding sequence of POS tags from the other computing device 200 via the network 112, as described more fully below. The answer can be determined using this information by the computing device 200 and/or the computing device 104. For example only, this most-likely parse of the text input can be used to obtain an answer to the user's question, such as "1.2 miles ahead on the left." The computing device 104 can then output this answer to the user 108 (via text and/or audio).

The discriminative dependency parsing techniques of the present disclosure may be particularly suitable for situations where a user provides a speech input representing a question to a computing device to obtain an answer to the question.

In these situations, the user is providing the question in real-time and is expecting an immediate or very quick answer in return, as if the user was having an actual conversation with the computing device. Discriminative dependency parsing techniques, therefore, may require a minimum degree of both speed and accuracy in order to be utilized for these question-answer situations. Because the discriminative dependency parsing techniques of the present disclosure jointly-maximize POS tagging and parsing, high quality (accurate) answers can be determined and provided to the user. Further, because the discriminative dependency parsing techniques of the present disclosure take advantage of various assumptions and filtering/pruning methods, the answer can be quickly determined and provided.

Figure 2:
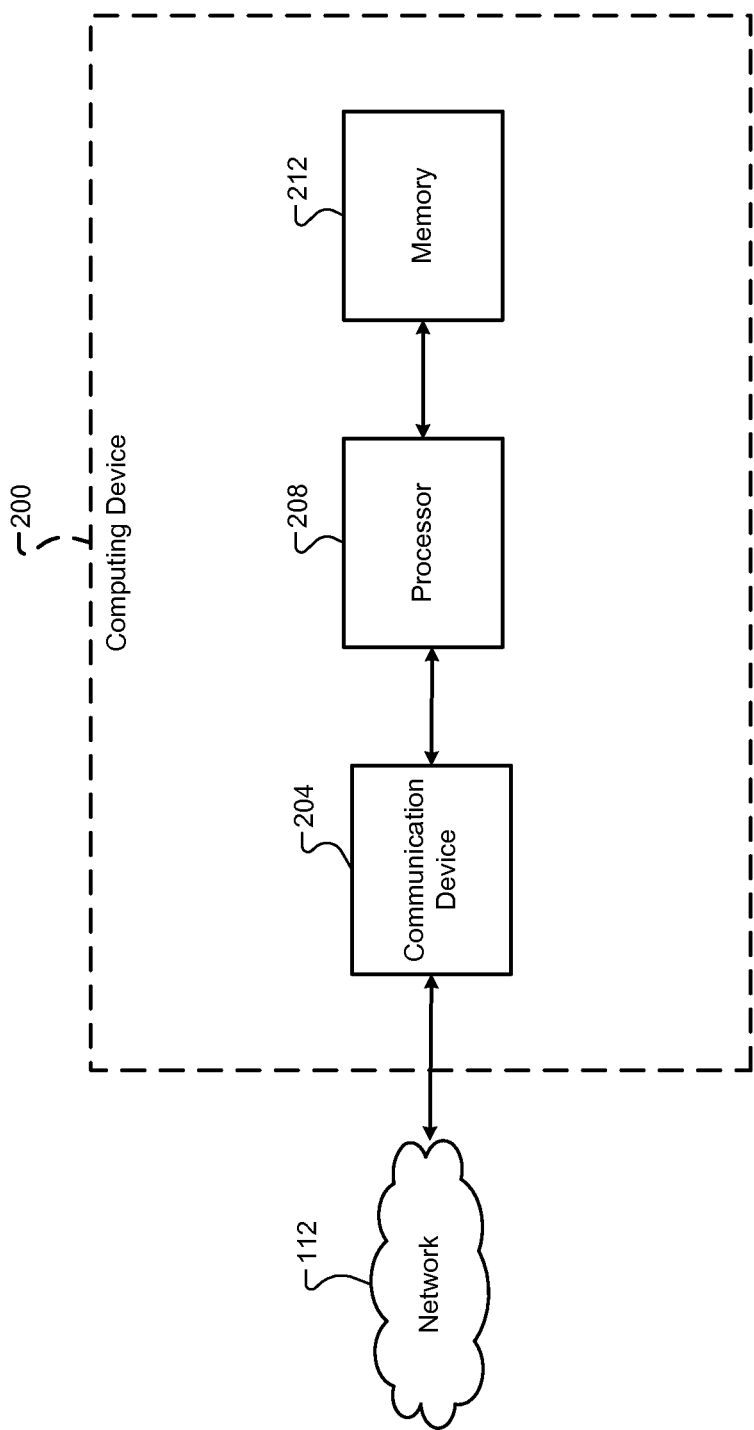
FIG. 2 is a functional block diagram of the example computing device of FIG. 1.

Referring now to FIG. 2, a functional block diagram of the example computing device 200 of FIG. 1 is illustrated. The computing device 200 can include a communication device 204, a processor 208, and a memory 212. The communication device 204 can control communication between the computing device 200 and other devices via the network 112. The communication device 204 can include any suitable components for communication via the network 112, e.g., a transceiver. In particular, the communication device 204 can control communication between the computing device 200 and the computing device 104 via the network 112. More specifically, the communication device 204 can receive a string of characters, e.g., representing a question, and can output a most-likely parse of the string of characters and its corresponding sequence of POS tags via the network 112. In some cases, the string of characters is received as a sequence of tokens, and the communication device 204 can receive the sequence of tokens representing words of the string of characters.

The processor 208 can control operation of the computing device 200. It should be appreciated that the term "processor" as used herein can refer to either a single processor or two or more processors operating in a parallel or distributed architecture. For example, the processor 208 can perform functions including, but not limited to loading and executing an operating system of the computing device 200, controlling information input to and/or output from the computing device 200, controlling communication over the network 112 via the communication device 204, and/or controlling read/write operations at the memory 212. The memory 212 can be any suitable storage medium (flash, hard disk, etc.) configured to store information at the computing device 200. The processor 208 can also execute the techniques according to the present disclosure.

In various embodiments of the present disclosure, the computing device 200 is configured to perform discriminative dependency parsing of a text input. Discriminative dependency parsing generally refers to the technique of analyzing a text to determine its grammatical structure. Discriminative dependency parsing can be utilized in machine translation as well as in other fields. In one example implementation, discriminative dependency parsing can be utilized to determine a grammatical structure of a text input representing a question, e.g., obtained from speech-to-text of a speech input, in order to determine and then output a best possible answer, e.g., a most relevant answer, to the question. For example only, the user 108 may input a question to the computing device 104.

The question may be a string of characters or may be speech input that is converted to the string of characters using suitable speech-to-text techniques. The computing device 104 may transmit the question to the computing device 200 for syntactic analysis to obtain a best answer to the question. The computing device 200 can implement the techniques of the present disclosure to determine a best (most-likely) parse and POS tagging of the string of characters. This information can then be used to obtain a best (most-likely) answer to the question. The computing device 200 can then transmit the answer to the question back to the computing device 104 to be provided to the user 108. The discriminative dependency parsing techniques of the present disclosure and their possible applicability/use are described in greater detail below.

Figure 3:
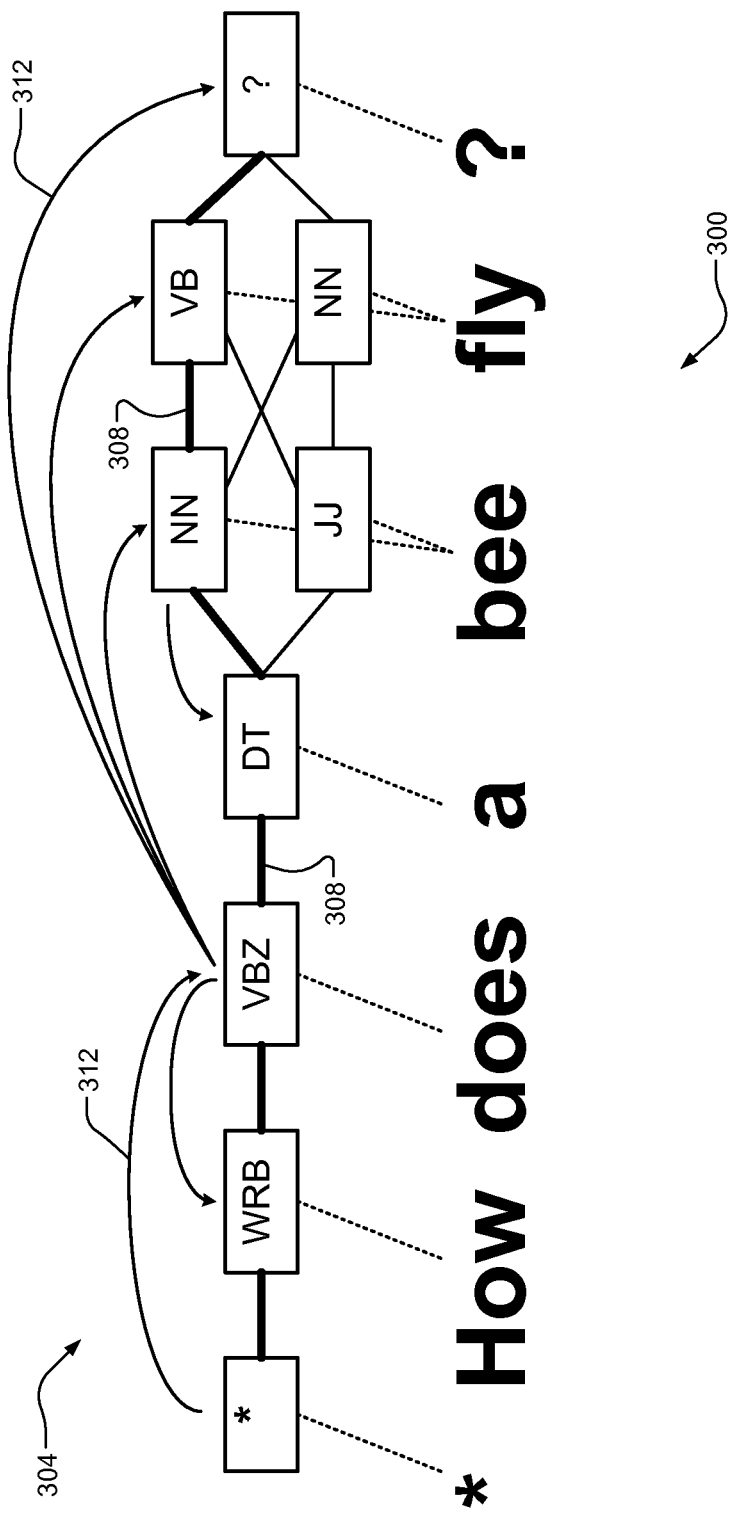
FIG. 3 is an illustration of an example sentence showing part-of-speech (POS) tags and parses according to some implementations of the present disclosure.

Referring now to FIG. 3, an example sentence 300 and parse tree 304 are depicted. The sentence 300 reads "How does a bee fly?" and has already been tokenized from an input text into words "How", "does", "a", "bee", and "fly", punctuation "?", and a special start token "*" indicating a start of the sentence 300. The sentence 300 can be described as having n+1 tokens $w=w_0 \ldots w_n$, where $w_0$ is a special start token ("*"). The sentence 300 can also be referred to as w (the set of all the words). Notation [n] can be used to denote the set of tokens $\{1 \ldots n\}$ and notation $[n]_0$ can be used to denote the set of tokens $\{0 \ldots n\}$.

The sentence 300 also has been annotated with POS tags. The terms "tag," "tagger," and "tagging" can be used as short-hand for the terms "POS tag," "POS tagger," and "POS tagging," respectively. Each token can have one or more POS tags associated with it. As shown, the token "bee" is associated with POS tags "NN" (noun) and "JJ" (adjective), e.g., because the token "bee" does not appear in a corresponding training data, and the token "fly" is associated with POS tags "VB" (verb) and "NN" (noun). A specific sequence of tags can be described as $x=x_1 \ldots x_n$, with each $x_i$ being from a set of POS tags $T(x_i \epsilon T)$.

Various parses of the sentence 300 can be illustrated by the parse tree 304. A parse can refer to a specific syntactic analysis or interpretation of a string of characters according to specific grammar rules. As shown, the parse tree 304 illustrates four potential sequences of POS tags for the sentence 300 (represented by line connectors 308) and defines dependencies between the POS tags (represented by arrows 312). The parsing problem is discussed in greater detail below after an initial discussion of the tagging problem. A most-likely parse can be indicated by the bold connectors 308.

The tagging problem can be modeled as a linear-chain conditional random field (CRF). For example, a trigram CRF can be used to increase accuracy compared to a bigram CRF. Accordingly, an index set B(w) can be defined over trigrams of the sentence w. In one implementation, the index set B(w) can be defined as follows:

$$B(w)=\{(i,t): i \epsilon [n], t \epsilon T^3\} \qquad (1),$$

where i represents an index from the set of tokens [n] ($\{1 \ldots n\}$) and t represents a POS tag from a set of POS tags T, A set of all valid taggings can be defined by binary vectors, e.g., $X(w) \subset \{0,1\}^{|B(w)|}$. B and X can be used to represent B(w) and X(w) when a dependence on w is unambiguous.

The trigram CRF can assume a score of the tagging factors into a linear function of the elements of B parameterized by a tagging weight vector $\theta_T$, which can be a portion $R^{|\theta_T|}$ of the parameters for the tagger $R^t$ ($\theta_T \epsilon R^t$). More generally, each trigram can be mapped to a set of features, which can then be scored. The features can be defined by a tagging feature matrix $F^{(w)}$. In one implementation, the tagging feature matrix $F^{(w)}$ can be defined as shown below, which is parameterized by the sentence w:

$$F^{(w)} \epsilon R^{|\theta_T| \times |B(w)|} \qquad (2).$$

A product of $F^{(w)}$ and x can produce the feature vector of a full tagging. Combining these elements, a maximum a posteriori (MAP) inference problem for tagging can be represented. In one implementation, the MAP inference problem can be defined as follows:

$$x^* = \underset{x \in X(w)}{\operatorname{argmax}} \theta_T^T F^{(w)} x, \qquad (3)$$

where x* represents a specific tagging or, rather, a specific sequence of POS tags, of the set of all valid taggings X, and $\theta_T^T$ represents a transform of the tagging weight vector $\theta_T$. Another related problem is calculating max-marginals ($m_T$: B→R) under this model. In one implementation, the max-marginals $m_T$ can be defined as follows:

$$m_T(p) = \underset{x \in X: x(p)=1}{\max} \theta_T^T F^{(w)} x, \qquad (4)$$

where p represents a probability, x represents a sequence of tags from the set of all valid taggings X, $\theta_T^T$ represents a transform of the tagging weight vector $\theta_T$, and $F^{(w)}$ represents the tagging feature matrix.

The dependency parsing problem can also be modeled as a CRF, e.g., a trigram CRF. As previously described, the parse tree 304 can define dependencies between POS tags, which are illustrated by the arrows 312. The arrows 312 can also be referred to as arcs, and thus the parse tree 304 can be divided into a set of arcs A. The arcs can describe an arc-factored or first-order model. An index set of first-order dependency arcs for the sentence w (hereinafter A(w)) can then be defined. In one implementation, the index set of first-order dependency arcs A(w) can be defined as follows:

$$A(w)=\{(h,m): h \in [n]_0, m \in n\} \qquad (5),$$

where h is a head index, m is a modifier index, and $[n]_0$ represents the set of tokens $\{0 \ldots n\}$.

The head index h can identify a specific token as a head having a modifier identified by the modifier index m. A set of possible parses Y(w) can then be defined using the index set of first-order dependency arcs A(w). A and Y can be used to represent A(w) and Y(w) when a dependence on w is unambiguous. In one implementation, the set of possible parses Y(w) can then be defined, e.g., $Y(w) \subset \{0,1\}^{|A(w)|}$.

As previously discussed, typical pipelined approaches select a one-best tagging x and treat it as ground truth. Given a sentence w and its one-best tagging x, a parsing feature matrix $G^{(x,w)}$ describing the parsing features can be constructed. In one implementation, the parsing feature matrix $G^{(x,w)}$ can be constructed as shown below, parameterized by the sentence w and its one-best tagging x:

$$G^{(x,w)} \in R^{|\theta_P| \times |A(w)|} \qquad (6),$$

where $G^{(x,y)}$ represents the parsing feature matrix, R represents a portion of the parameters for the parser, $\theta_P$ represents the parsing feature vector, and A(w) represents the index set of first-order dependency arcs.

Combining these elements, a MAP inference problem for dependency parsing can be represented. In one implementation, the MAP inference problem for dependency parsing can be defined as follows:

$$y^* = \underset{y \in Y(w)}{\operatorname{argmax}} \theta_P^T G^{(x,w)} y, \qquad (7)$$

where y* represents a specific parsing of the set of all parses Y, $\theta_P^T$ represents a transform of the parsing weight vector $\theta_P$, and $G^{(x,w)}$ represents the parsing feature matrix. As previously discussed, however, performing tagging and parsing as independent tasks as described above can cause tagging errors that can propagate and negatively affect the parser. Again, another related problem is calculating max-marginals ($m_P$: A→R) under this model.

Accordingly, techniques are presented herein for discriminative dependency parsing by jointly analyzing and selecting a desired tagging and a desired parse. A MAP inference problem for joint tagging and parsing can be represented as a combination of the individual MAP inference problems described above. In one implementation, the MAP inference problem for joint tagging and parsing can be defined as follows:

$$(x^*, y^*) = \underset{x \in X, y \in Y}{\operatorname{argmax}} \theta_T^T F^{(w)} x + \theta_P^T G^{(x,w)} y, \qquad (8)$$

where (x*, y*) represents a specific sequence of POS tags and a specific parse. The second summand of this equation, however, is no longer linear: it depends on both x (the tagging) and y (the parsing). This can result in the MAP inference cost becoming very large, which can cause system delay (slow/inefficient processing).

One manner to decrease the MAP inference cost for joint tagging and parsing is to decrease or restrict the size of the parsing feature matrix $G^{(x,w)}$. Less features, however, typically results in decreased accuracy. Therefore, the feature structure of parsing can be exploited to linearize the MAP inference problem above for joint tagging and parsing. More particularly, soft assignments of features can be utilized to maintain increased accuracy.

The parsing feature matrix $G^{(x,w)}$ can be divided into three categories of features: (1) arc features, (2) contextual features, and (3) between features. Arc features can depend on the words and tags directly associated with the head and modifier indices h and m, respectively. Contextual features can depend on combinations of the tags in the immediate (neighboring) context of the head and the modifier. Between features can depend on the tags between the head and the modifier.

To specify the features, $\phi_A$: A→[|A|] can represent a bijective function from an arc to its index value. Each column of the parsing feature matrix $G^{(x,w)}$ can correspond to index value $\phi_A(h,m)$ for some head position h and some modifier position m. For parsing, each column can consist of a small set of "on" features having a value of 1. In one implementation, the full set of features for a column can be summarized as follows:

$$([w_h, w_m, (w_h, x_h), (w_m, x_m), (w_h, x_m), (x_h, x_m)] + [(x_h, x_{h+u}, x_m, x_{m+v}): u, v \in \{-1,1\}]) \times [(h-m), \phi] \qquad (9),$$

where $w_h$ represents a head word, $w_m$ represents a modifier word, $x_h$ represents a head tag, and $x_m$ represents a modifier tag, and u and v represent each represent integers from −1 to 1, The contextual and between features represent non-local features. Because between features only provide for a very small gain in performance, these features can be dropped for only a small performance penalty. Further, the optimization problem can be rewritten to expose local dependence implicit in the contextual features, and thus the irrelevant contextual features can be decreased. A new joint index set J can be defined to include the arc features and relevant contextual features.

In one implementation, the new joint index set J can be defined as follows:

$$J = \{(h,m,t,u) : (h,m) \in A, (h,t), (m,u) \in B\} \quad (10),$$

where t represents a trigram context centered at a specific head token and u represents a specific trigram context centered at its specific modifier token. To simplify the notation, the following projections can be defined for $j=(h,t,m,u) \in J$:

$$j_{arc} = (h,m), j_{ht} = (h,t),$$

$$j_{mt} = (m,u), \text{ and } j_{mod} = m \quad (11).$$

This new joint index set J can make it possible to remove the dependence on the parsing feature matrix $G^{(x,w)}$ on the tag sequence x. The parsing feature matrix $G^{(x,w)}$ can then be factored into a new matrix $H(w) \in R^{|J| \times |\theta_P|}$. Employing this new matrix H(w), the MAP inference problem for joint tagging and parsing can be rewritten. In one implementation, the MAP inference problem for joint tagging and parsing can be redefined as follows:

$$\max_{x \in X, y \in Y} \theta_T^T F^{(w)} x + \theta_P^T \sum_{j \in J} H_{*,\phi_J(j)}^{(w)} y(j_{arc}) x(j_{ht}) x(j_{mt}), \quad (12)$$

where $\phi_J(j)$ represents specific features.

This rewritten MAP inference problem for joint tagging and parsing can also be linearized by introducing a new variable z to replace the cubic terms $y(j_{arc})x(j_{ht})x(j_{mt})$. As a result, an integer linear program (ILP) for joint tagging and parsing can be obtained. By solving this ILP, the best (most-likely) sequence of tags (tagging) and parsing can be determined and selected. In one implementation, the ILP for joint tagging and parsing can be described as follows:

$$\max_{x \in X, y \in Y, z \in \{0,1\}^{|J|}} \theta_T^T F^{(w)} x + \theta_P^T H z, \quad (13)$$

$$\sum_{j \in J : j_{arc} = a} z(j) = x(a) \; \forall \, a \in A, \quad (14)$$

$$\sum_{j \in J : j_{mt} = b} z(j) = y(b) \; \forall \, b \in B, \text{ and} \quad (15)$$

$$\sum_{j \in J : j_{ht} = b, j_{mod} = m} z(j) = y(b) \; \forall \, b \in B, m \in [n] \quad (16)$$

where a represents a specific arc of the set of first-order dependency arcs A and b represents a specific trigram of the set of trigrams B.

As shown, the ILP for joint tagging and parsing can be subject to three different constraints. A first constraint (14) can ensure that z produces a valid parse structure by constraining it to $x \in X$. Next, a second constraint (15) can ensure that when a token is used as a modifier, its tag context agrees with the tagging $y \in Y$. Lastly, a third constraint (16) can similarly ensure that if a token is used as a head, its tag context agrees with the same valid tagging $y \in Y$. In other words, these second and third constraints (15) and (16) can enforce tag consistency.

A first method of solving the ILP for joint tagging and parsing can involve using an exact dynamic programming algorithm. The exact dynamic programming algorithm can involve treating all the possible local tag contexts for every token in a sentence as possible words senses for each token instead of adjacent tags. Any suitable dependency parsing algorithm that uses word senses can then be applied to solve the ILP for joint tagging and parsing. This process can also be sped up by exploiting the fact that neighboring tokens constrain each other's contexts.

A second method of solving the ILP for joint tagging and parsing can involve utilizing a relaxed method. The relaxed method may be faster than the exact dynamic programming algorithm. The relaxed method can involve parsing with independent tagging. More specifically, tag consistency can be ignored to develop a faster, relaxed algorithm for parsing with independent tagging. It should be appreciated, however, that other suitable techniques can be utilized to solve the ILP for joint tagging and parsing other than the two methods described herein.

A discrete set Z can be formed by dropping the second and third constraints (15) and (16), which enforced tag consistency in the ILP for joint tagging and parsing. In one implementation, the discrete set Z can be defined as follows:

$$Z = \left\{ z : \sum_{j \in J : j_{arc} = a} z(j) = y(a) \forall \, y \in Y, a \in A \right\}. \quad (17)$$

This discrete set Z can enforce that all structures z are valid parses with contextual tags, but can allow each arc to choose its contextual tag independently. For example only, in FIG. 3 the token "fly" has different POS tags as a head and as a modifier.

A maximization of the discrete set Z over some weight vector θ can then be calculated $$\left( \max_{z \in Z} \theta^T z \right).$$

This maximization can be calculated efficiently by dynamic programming. More specifically, instead of treating the tag contexts as word senses, they can be treated as arc labels, i.e., each arc can be labeled with its chosen head and modifier context. This algorithm, however, may perform poorly on its own, and thus other techniques can be utilized to increase system speed/efficiency.

The relaxed method discussed above can correspond to a Lagrangian dual problem of optimization for the ILP for joint tagging and parsing. Therefore, algorithms can be derived to solve this Lagrangian dual problem to thereby solve the ILP for joint tagging and parsing. A new set C can be utilized that enforces the tag consistency constraints (15) and (16) from the ILP and that were dropped from the discrete set Z. In one implementation, this new set C can be defined as follows:

$$C = \left\{ x \in \{0,1\}^{|B|}, \; z \in \{0,1\}^{|J|} : \forall \, b \in B, m \in [n] \right. \quad (18)$$

$$\sum_{t \in T} x(m,t) = 1, \quad \sum_{j \in J : j_{mt} = b} z(j) = x(b)$$

$$\left. \sum_{j \in J : j_{mod} = m} z(j) = 1, \quad \sum_{j \in J : j_{ht} = b, j_{mod} = m} z(j) \leq x(b) \right\}.$$

Note that two redundant constraints can be added to enforce that each token is tagged only once and is a modifier exactly once, respectively.

The ILP for joint tagging and parsing can then be rewritten with Z and C. In one implementation, the ILP can be redefined as follows:

$$\max_{x \in X, z \in Z, (x', z') \in C} \theta_T^T F x + \theta_P^T H z, \quad (19)$$

where $x = x'$, and $z = z'$. The Lagrangian dual problem of this rewritten ILP can then be formed by relaxing both constraints with dual variables $\lambda \in R^{|B|}$ and $\beta = R^{|J|}$, where R represents parameters of the tagger $\theta_T \in R^t$ and the parser $\theta_P \in R^p$. In one implementation, after redistributing terms, the Lagrangian dual problem can be defined as follows:

$$\min_{\lambda, \beta} \max_{x \in X} (\theta_T^T F + \beta^T) x + \quad (20)$$

$$\max_{z \in Z} (\theta_P^T H + \lambda^T) z - \quad (21)$$

$$\max_{(x', z') \in C} \beta^T x' + \lambda^T z'. \quad (22)$$

Given an assignment to dual variables, each of these maximization problems (20), (21), and (22) can be solved. Problem (20) can be solved using a Viterbi algorithm for trigram tagging MAP. Problem (21) can be solved using the dynamic programming algorithm for parsing with independent tagging described above. Problem (22) can be represented as a Markov random field (MRF) and this problem and the corresponding max-marginal problem can be solved using a MAP algorithm with high-order potentials (HOP-MAP). It should be appreciated, however, that other suitable algorithms can be used to solve one or more of Problems (20), (21), and (22).

In another implementation, instead of directly solving the rewritten ILP, the dual objective can be optimized. This approach can also be referred to as dual decomposition. For example, the dual decomposition can involve sub-gradient or augmented Lagrangian methods for dual decomposition. It should be appreciated that other suitable dual decomposition methods can be used. By utilizing a dual decomposition approach, max-marginals can also be used to update dual parameters as opposed to just the MAP solution. Dual decomposition can result in increased system speed/efficiency with minimal or no effects to accuracy.

In yet another implementation, coarse-to-fine pruning can be utilized to solve the rewritten ILP. This approach can be used as an approximation method for speeding up solving of an inference problem and, in particular, dependency parsing. Coarse-to-fine pruning can involve reducing portions of a search space without losing overall system accuracy. The effectiveness of the coarse-to-fine pruning approach can be determined by the choice of its coarse models. In one implementation, the relaxations derived from the Lagrangian dual problem above can be utilized, which can also be referred to as structured ensemble cascades.

Figure 4:
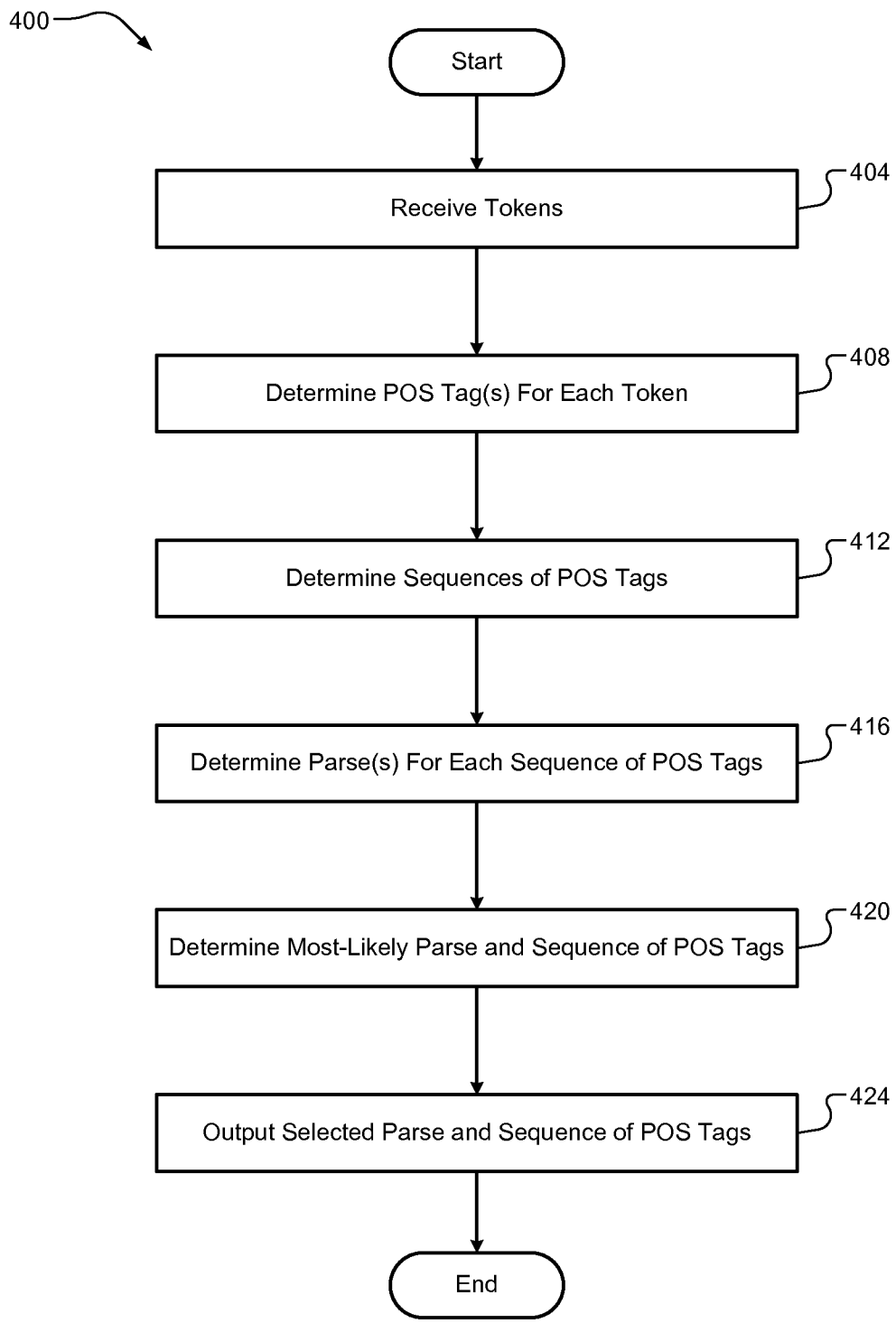
FIG. 4 is a flow diagram of an example technique for discriminative dependency parsing according to some implementations of the present disclosure.

Referring now to FIG. 4, a flow diagram of an example technique 400 for discriminative dependency parsing is illustrated. At 404, the computing device 200 can receive tokens corresponding to a string of characters in a natural language, each token representing a potential word including at least one character of the string of characters. In some implementations, the string of characters can represent a question, e.g., received from the user 108 via the computing device 104. At 408, the computing device 200 can determine one or more POS tags for each token. At 412, the computing device 200 can determine sequences of the POS tags for the tokens, each sequence of the POS tags including one POS tag per token.

At 416, the computing device 200 can determine one or more parses for each sequence of the POS tags for the tokens. At 420, the computing device 200 can determine a most-likely parse and its corresponding sequence of the POS tags for the tokens to obtain a selected parse and a selected sequence of the POS tags for the tokens. At 424, the computing device 200 can output the selected parse and the selected sequence of the POS tags for the tokens. In some implementations, the selected parse and the selected sequence of POS tags for the tokens can be used to determine an answer to the question, which can then be output, e.g., to the computing device 104. The technique 400 can then end or return to 404 for one or more additional cycles.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include: an Application Specific Integrated Circuit (ASIC); an electronic circuit; a combinational logic circuit; a field programmable gate array (FPGA); a processor or a distributed network of processors (shared, dedicated, or grouped) and storage in networked clusters or datacenters that executes code or a process; other suitable components that provide the described functionality; or a combination of some or all of the above, such as in a system-on-chip. The term module may also include memory (shared, dedicated, or grouped) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method, comprising:
receiving, at a computing device having one or more processors, a speech input representing a question;
converting, at the computing device, the speech input to a string of characters in a natural language;
obtaining, at the computing device, tokens corresponding to the string of characters in the natural language, each token representing a potential word including at least one character of the string of characters;
determining, at the computing device, one or more part-of-speech (POS) tags for each token;
determining, at the computing device, sequences of the POS tags for the tokens, each sequence of the POS tags including one POS tag per token;
determining, at the computing device, one or more parses for each sequence of the POS tags for the tokens;
determining, at the computing device, a most-likely parse and its corresponding sequence of the POS tags for the tokens to obtain a selected parse and a selected sequence of the POS tags for the tokens by solving a maximum-a-posteriori (MAP) inference problem defined as:

$$(x^*, y^*) = \underset{x \in X, y \in Y}{\operatorname{argmax}} \theta_T^T F^{(w)} x + \theta_P^T G^{(x,w)} y,$$

where x* and y* represent a specific sequence of the POS tags and a specific parse, respectively, X represents a set of the POS tags x, Y represents a set of the parses y, $\theta_T^T$ represents a transformed tagging weight vector, $F^{(w)}$ represents a tagging feature matrix, $\theta_P^T$ represents a transformed parsing weight vector, and $G^{(x,w)}$ represents a parsing feature matrix;

determining, at the computing device, a most-likely answer to the question using the selected parse and the selected sequence of the POS tags for the tokens; and outputting, by the computing device, the most-likely answer.

2. The computer-implemented method of claim 1, wherein solving the MAP inference problem further comprises solving an integer linear program (ILP) defined as:

$$\max_{x \in X, y \in Y, z \in \{0,1\}^{|J|}} \theta_T^T F^{(w)} x + \theta_P^T H z,$$

$$\sum_{j \in J: j_{arc}=a} z(j) = x(a) \ \forall \ a \in A,$$

$$\sum_{j \in J: j_{mt}=b} z(j) = y(b) \ \forall \ b \in B, \text{ and}$$

$$\sum_{j \in J: j_{ht}=b, j_{mod}=m} z(j) = y(b) \ \forall \ b \in B, m \in [n],$$

where J represents a set of joint features j, each joint feature j corresponding to a head position h, a modifier position m, a trigram context t centered at the head, and a trigram context ti centered at the modifier, H represents a parsing feature matrix based on the feature matrix $G^{(x,w)}$ but having a dependency on x removed, z represents a variable replacing cubic terms $y(j_{arc})x(j_{ht})x(j_{mt})$ with $j_{arc}=(h,m)$, $j_{ht}=(h,t)$, $j_{mt}=(m,u)$, and $j_{mod}=m$, a represents a specific arc of a set of first-order dependency arcs A, b represents a specific trigram of a set of trigrams B, and [n] represents a set of the tokens.

3. The computer-implemented method of claim 2, wherein solving the ILP includes utilizing, at the computing device, an exact dynamic programming algorithm.

4. The computer-implemented method of claim 2, wherein solving the ILP includes utilizing, at the computing device, relaxed parsing with independent contextual tagging.

5. The computer-implemented method of claim 4, wherein solving the ILP further includes performing, at the computing device, coarse-to-fine pruning to increase a speed of determining the most-likely parse and its corresponding sequence of the POS tags for the tokens.

6. The computer-implemented method of claim 5, wherein solving the ILP utilizing relaxed parsing with independent contextual tagging includes solving, at the computing device, the ILP as a Lagrangian dual decomposition defined as follows:

$$\min_{\lambda, \beta} \max_{x \in X} (\theta_T^T F + \beta^T) x + \max_{z \in Z} (\theta_P^T H + \lambda^T) z - \max_{(x',z') \in C} \beta^T x' + \lambda^T z',$$

where Z represents a set of all z, $\lambda^T$ and $\beta^T$ represent transforms of matrices $\lambda \in R^{|B|}$ and $\beta = R^{|J|}$, R represents parameters of the tagger $\theta_T \in R^t$ and the parser $\theta_P \in R^p$, x=x', and z=z', and where C represents a set defined as:

$$C = \left\{ x \in \{0, 1\}^{|B|}, \ z \in \{0, 1\}^{|J|} : \forall \ b \in B, m \in [n] \right.$$

$$\sum_{t \in T} x(m, t) = 1, \qquad \sum_{j \in J: j_{mt}=b} z(j) = x(b)$$

$$\left. \sum_{j \in J: j_{mod}=m} z(j) = 1, \qquad \sum_{j \in J: j_{ht}=b, j_{mod}=m} z(j) \le x(b) \right\}.$$

7. The computer-implemented method of claim 1, further comprising tokenizing, at the computing device, the string of characters to obtain the tokens.

8. A computing device, comprising:

a communication device configured to:
  receive a speech input representing a question; and
  output a most-likely answer to the question; and one or more processors configured to:
  convert the speech input to a string of characters in a natural language;
  obtain tokens corresponding to the string of characters in the natural language, each token representing a potential word including at least one character of the string of characters;
  determine one or more part-of-speech (POS) tags for each token;
  determine sequences of the POS tags for the tokens, each sequence of the POS tags including one POS tag per token;
  determine one or more parses for each sequence of the POS tags for the tokens;
  determine a most-likely parse and its corresponding sequence of the POS tags for the tokens to obtain a selected parse and a selected sequence of the POS tags for the tokens by solving a maximum-a-posteriori (MAP) inference problem defined as:

$$(x^*, y^*) = \underset{x \in X, y \in Y}{\operatorname{argmax}} \theta_T^T F^{(w)} x + \theta_P^T G^{(x,w)} y,$$

where x* and y* represent a specific sequence of the POS tags and a specific parse, respectively, X represents a set of the POS tags x, Y represents a set of the parses v, $\theta_T^T$ represents a transformed tagging weight vector, $F^{(w)}$ represents a tagging feature matrix, $\theta_P^T$ represents a transformed parsing weight vector, and $G^{(x,w)}$ represents a parsing feature matrix; and determine the most-likely answer to the question using the selected parse and the selected sequence of the POS tags for the tokens.

9. The computing device of claim 8, wherein solving the MAP inference problem comprises solving an integer linear program (ILP) defined as:

$$\max_{x \in X, y \in Y, z \in \{0,1\}^{|J|}} \theta_T^T F^{(w)} x + \theta_P^T H z,$$

$$\sum_{j \in J: j_{arc}=a} z(j) = x(a) \ \forall \ a \in A,$$

$$\sum_{j \in J: j_{mt}=b} z(j) = y(b) \ \forall \ b \in B, \text{ and}$$

-continued $$\sum_{j \in J: j_{ht}=b, j_{mod}=m} z(j) = y(b) \ \forall \ b \in B, m \in [n],$$

where J represents a set of joint features j, each joint feature j corresponding to a head position h, a modifier position m, a trigram context t centered at the head, and a trigram context ti centered at the modifier, H represents a parsing feature matrix based on the feature matrix $G^{(x,w)}$ but having a dependency on x removed, z represents a variable replacing cubic terms $y(j_{arc})x(j_{ht})x(j_{mt})$ with $j_{arc}=(h,m)$, $j_{ht}=(h,t)$, $j_{mt}=(m,u)$, and $j_{mod}=m$, a represents a specific arc of a set of first-order dependency arcs A, b represents a specific trigram of a set of trigrams B, and [n] represents a set of the tokens.

10. The computing device of claim 9, wherein the one or more processors are configured to solve the ILP by utilizing an exact dynamic programming algorithm.

11. The computing device of claim 9, wherein the one or more processors are configured to solve the ILP by utilizing relaxed parsing with independent contextual tagging.

12. The computing device of claim 11, wherein the one or more processors are configured to solve the ILP further by performing coarse-to-fine pruning to increase a speed of determining the most-likely parse and its corresponding sequence of the POS tags for the tokens.

13. The computing device of claim 12, wherein the one or more processors are configured to solve the ILP utilizing relaxed parsing with independent contextual tagging by solving the ILP as a Lagrangian dual decomposition defined as follows:

$$\min_{\lambda,\beta} \max_{x \in X} (\theta_T^T F + \beta^T)x + \max_{z \in Z}(\theta_P^T H + \lambda^T)z - \max_{(x',z') \in C} \beta^T x' + \lambda^T z',$$

where Z represents a set of all z, $\lambda^T$ and $\beta^T$ represent transforms of matrices $\lambda \in R^{|B|}$ and $\beta = R^{|J|}$, R represents parameters of the tagger $\theta_T \in R^t$ and the parser $\theta_P \in R^p$, x=x', and z=z', and where C represents a set defined as:

$$C = \left\{ x \in \{0, 1\}^{|B|}, \ z \in \{0, 1\}^{|J|} : \forall \ b \in B, m \in [n] \right.$$
$$\sum_{t \in T} x(m, t) = 1, \quad \sum_{j \in J: j_{mt}=b} z(j) = x(b)$$
$$\left. \sum_{j \in J: j_{mod}=m} z(j) = 1, \quad \sum_{j \in J: j_{ht}=b, j_{mod}=m} z(j) \leq x(b) \right\}.$$

14. The computing device of claim 8, wherein the one or more processors are further configured to tokenize the string of characters to obtain the tokens.

15. A non-transitory, computer-readable medium having instructions stored thereon that, when executed by one or more processors of a computing device, cause the computing device to perform operations comprising:
receiving a speech input representing a question;
converting the speech input to a string of characters in a natural language;
obtaining tokens corresponding to a string of characters in a natural language, each token representing a potential word including at least one character of the string of characters;
determining one or more part-of-speech (POS) tags for each token;
determining sequences of the POS tags for the tokens, each sequence of the POS tags including one POS tag per token;
determining one or more parses for each sequence of the POS tags for the tokens;
determining a most-likely parse and its corresponding sequence of the POS tags for the tokens to obtain a selected parse and a selected sequence of the POS tags for the tokens by solving a maximum-a-posteriori (MAP) inference problem defined as:

$$(x^*, y^*) = \operatorname*{argmax}_{x \in X, y \in Y} \theta_T^T F^{(w)} x + \theta_P^T G^{(x,w)} y,$$

where x* and y* represent a specific sequence of the POS tags and a specific parse, respectively, X represents a set of the POS tags x, Y represents a set of the parses y, $\theta_T^T$ represents a transformed tagging weight vector, $F^{(w)}$ represents a tagging feature matrix, $\theta_P^T$ represents a transformed parsing weight vector, and $G^{(x,w)}$ represents a parsing feature matrix;
determining a most-likely answer to the question using the selected parse and the selected sequence of the POS tags for the tokens; and
outputting the most-likely answer.

16. The computer-readable medium of claim 15, wherein solving the MAP inference problem comprises solving an integer linear program (ILP) defined as:

$$\max_{x \in X, y \in Y, z \in \{0,1\}^{|J|}} \theta_T^T F^{(w)} x + \theta_P^T H z,$$
$$\sum_{j \in J: j_{arc}=a} z(j) = x(a) \ \forall \ a \in A,$$
$$\sum_{j \in J: j_{mt}=b} z(j) = y(b) \ \forall \ b \in B, \text{ and}$$
$$\sum_{j \in J: j_{ht}=b, j_{mod}=m} z(j) = y(b) \ \forall \ b \in B, m \in [n],$$

where J represents a set of joint features j, each joint feature j corresponding to a head position h, a modifier position m, a trigram context t centered at the head, and a trigram context ti centered at the modifier, H represents a parsing feature matrix based on the feature matrix $G^{(x,w)}$ but having a dependency on x removed, z represents a variable replacing cubic terms $y(j_{arc})x(j_{ht})x(j_{mt})$ with $j_{arc}=(h,m)$, $j_{ht}=(h,t)$, $j_{mt}=(m,u)$, and $j_{mod}=m$, a represents a specific arc of a set of first-order dependency arcs A, b represents a specific trigram of a set of trigrams B, and [n] represents a set of the tokens.

17. The computer-readable medium of claim 15, wherein the operations further include tokenizing the string of characters to obtain the tokens.

* * * * *